United States Patent
Bolz (10) Patent No.: US 9,437,025 B2
(45) Date of Patent: Sep. 6, 2016

(54) STENCIL DATA COMPRESSION SYSTEM AND METHOD AND GRAPHICS PROCESSING UNIT INCORPORATING THE SAME

(75) Inventor: Jeffrey A. Bolz, Austin, TX (US)

(73) Assignee: NVIDIA CORPORATION, Santa Clara, CA (US)

( * ) Notice: Subject to any disclaimer, the term of this patent is extended or adjusted under 35 U.S.C. 154(b) by 33 days.

(21) Appl. No.: 13/547,362

(22) Filed: Jul. 12, 2012

(65) Prior Publication Data

US 2014/0015843 A1 Jan. 16, 2014

(51) Int. Cl.
*G06T 15/60* (2006.01)
*G06T 9/00* (2006.01)
*G06T 11/40* (2006.01)

(52) U.S. Cl.
CPC ............. *G06T 11/40* (2013.01); *G06T 9/00* (2013.01); *G06T 15/60* (2013.01); *G09G 2340/02* (2013.01)

(58) Field of Classification Search
CPC .. G06T 15/60; G06T 15/405; G09G 2340/02
USPC ................................ 345/530, 555, 556, 563
See application file for complete search history.

(56) References Cited

U.S. PATENT DOCUMENTS

| | | | |
|---|---|---|---|
| 4,737,921 A | 4/1988 | Goldwasser et al. | |
| 6,016,150 A | 1/2000 | Lengyel et al. | |
| 6,072,500 A | 6/2000 | Foran et al. | |
| 6,075,544 A | 6/2000 | Malachowsky et al. | |
| 6,774,895 B1 * | 8/2004 | Papakipos et al. | 345/422 |
| 6,825,847 B1 * | 11/2004 | Molnar et al. | 345/555 |
| 6,876,362 B1 | 4/2005 | Newhall, Jr. et al. | |
| 6,961,057 B1 | 11/2005 | Van Dyke et al. | |
| 7,248,261 B1 * | 7/2007 | Hakura | 345/426 |
| 7,277,098 B2 | 10/2007 | Xu et al. | |
| 7,659,893 B1 | 2/2010 | Oberman et al. | |
| 8,115,767 B2 | 2/2012 | Stich | |
| 8,184,117 B2 * | 5/2012 | Brennan | 345/420 |

OTHER PUBLICATIONS

Foreign Communication from a Related Counterpart Application; German Patent Application No. 10 2013 011 608.2; Office Action dated Dec. 15, 2014; 9 pages.
Wikipedia, "Graphics Pipeline", http://en.wikipedia.org/w/index.php?title=Graphics_pipeline&oldid=4; dated Apr. 26, 2012, 1 page.

* cited by examiner

*Primary Examiner* — Joni Richer (57) ABSTRACT

A system and method for compressing stencil data attendant to rendering an image. In one embodiment, the method includes: (1) selecting a base stencil value for a particular group, (2) selecting a single-bit delta value for each sample in the particular group and (3) storing the stencil base value and the delta values in a frame buffer.

17 Claims, 6 Drawing Sheets

STENCIL DATA COMPRESSION SYSTEM AND METHOD AND GRAPHICS PROCESSING UNIT INCORPORATING THE SAME

TECHNICAL FIELD

This application is directed, in general, to graphics processing and, more specifically, to stencil data compression.

BACKGROUND

Rendering a computer-generated image on a screen of pixels entails several steps. Conventionally, the image is first decomposed into many primitive objects, most typically triangles. Each triangle is then transformed into a screen-aligned coordinate system. Thereafter, each triangle is divided into fragments in a rasterization process. Each fragment corresponds to each screen pixel covered by the triangle.

Each fragment has associated with it a number of data items, including one or more color, depth and stencil values. The color values are used to establish the colors of the fragments. The depth values are used to determine which fragments will be visible on the screen (z-buffering). The stencil values are used to determine which fragments are to be rendered. (Since z-buffering and stenciling are closely related, depth and stencil values are typically stored in the same buffer.) The fragment color, depth and stencil values are written to the display memory if the fragment is determined to be properly rendered and visible.

A typical scene is composed of many triangles. As each triangle covers a number of pixels, the number fragments to be written to the display memory can be large. For instance, a scene may be composed of 1,000,000 triangles, each of which may cover 50 pixels. If the scene is rendered 60 times a second, 3,000,000,000 fragments must be generated, processed and sent to the frame buffer every second.

If each such fragment carries about ten bytes of data, 30 Gbytes of data must be processed and stored every second. Further, many applications arithmetically blend newly rendered fragments with the contents of the frame buffer, doubling the data that must be transferred to and from the frame buffer.

The foregoing problem is exacerbated if anti-aliasing is performed. In the most common anti-aliasing algorithms, supersampling and multisampling, multiple fragments are computed and stored in the frame buffer for every screen pixel in order to reduce sampling artifacts in the rendered image (See U.S. Pat. No. 6,072,500). Anti-aliasing using these techniques therefore increases the load imposed on the fragment processing stage of a graphics system proportionally to the number of samples per pixel.

Processing a large number of fragments is difficult for a variety of reasons. Frame buffer accesses for reading and writing pixel data require a large amount of frame buffer bandwidth. Therefore, in many systems, the available frame buffer bandwidth limits the fragment-processing rate. Similarly, transferring the fragments among the internal stages of a graphics system demands a high internal bandwidth in the fragment processing stage, which also tends to limit the fragment-processing rate. So too, processing the fragments as they travel through the graphics system consumes a large amount of processing power, e.g., for stenciling, z-buffering or alpha blending. Available processing power may also limit the fragment-processing rate.

SUMMARY

One aspect provides a stencil compression method. In one embodiment, the method includes: (1) selecting a base stencil value for a particular group, (2) selecting a single-bit delta value for each sample in the particular group and (3) storing the stencil base value and the delta values in a frame buffer.

Another aspect provides a data compression system. In one embodiment, the system includes: (1) a rasterizer configured to select an 8-bit base value for a particular group and further select single-bit delta values for samples in the particular group and (2) a frame buffer configured to store the base value and the delta values, operations with respect to the particular group being performable on the base value and at least one of the delta values without requiring decompression thereof.

Yet another aspect provides a graphics processing unit (GPU). In one embodiment, the GPU includes: (1) a geometry stage configured to transform primitives into a screen-aligned coordinate system, (2) a rasterizer coupled to the geometry stage and configured to compute a fragment for each pixel covered by each of the primitives, divide the pixels into groups, select a base stencil value for a particular group and select a single-bit delta value for each sample in the particular group and (3) a frame buffer coupled to the rasterizer and configured to store the stencil base value and the delta values for the particular group if the particular group is compressible and further configured to store uncompressed stencil data for the particular group in lieu of the base stencil value and the delta values if the particular group is incompressible.

BRIEF DESCRIPTION

Reference is now made to the following descriptions taken in conjunction with the accompanying drawings, in which.

DETAILED DESCRIPTION

As stated above, processing a large number of fragments is difficult for a variety of reasons. The need has been realized for a graphics processing technique that compresses fragments as they travel through the graphics system and stores the compressed fragments in a compressed format.

Conventional stencil algorithms use some kind of "counting," e.g., wrapping increment (incr_wrap) or wrapping decrement (decr_wrap) operations in the OpenGL Graphics System, to partition the screen into two regions. For example, stencil shadow volumes partition the screen into "lit" and "shadowed" regions by counting front and back faces of frustums extruded from a light source through a triangle. Stencil-then-cover path rendering partitions the screen into "inside the path" and "outside the path" regions by computing a winding number essentially by counting front- and back-facing triangles. Silhouette algorithms jitter a given silhouette geometry and count how many times the edges of the jittered geometry touch each pixel, with silhouette edges having a value $0<s(x,y)<N$.

What these stencil algorithms have in common is that the geometry itself may be complex (and perhaps contain "slivery" triangles, which are triangles having one very small acute angle in screen space), yet the scene overall has highly coherent stencil values which yearn for compression.

Certain design goals are associated with certain embodiments of the system and method. First, certain embodiments of the system and method should be able to accommodate most, if not all, slivery triangles. Second, certain embodiments of the system and method should lend themselves to an area/power-efficient hardware implementation. Third, stencil operations or tests should be able to be performed at an increased rate without requiring additional functional units. Accordingly, various embodiments of the system and method introduced herein are able to accommodate most slivery triangles by employing full sample resolution, are amenable to an area/power-efficient hardware implementation because they accommodate common stencil operations as simple bit manipulation without requiring additional functional units for, e.g., decompression and recompression. In various illustrated and described embodiments, the stencil data compression system and method introduced herein has a 4:1 bandwidth compression, an 8:1 stencil operation acceleration and a 4:1 or 8:1 stencil test acceleration. Embodiments of the system and method further apply to many common stenciling algorithms (e.g., stencil shadow volume rendering, or SSV, Nvidia path rendering, or NVpr, and deferred rendering).

Specific embodiments to be described in detail hereinafter compress a "group" of eight 8-bit stencil values as one 8-bit base value and eight 1-bit unsigned delta values (treated as a mask), yielding a 4:1 compression ratio. In an example GPU architecture in which z-buffering circuitry interfaces with level two cache memory and the frame buffer at a 32B "subpacket" granularity, 16 of these two 8-bit groups can be communicated in each subpacket, representing 128 stencil samples per subpacket. In various embodiments, the size of the group remains at eight 8-bit stencil values irrespective of the full scene anti-aliasing (FSAA) mode in which the GPU is operating.

It is realized herein that the data compression and method are not only employable with respect to integer data that is not stencil data but can be particularly advantageous when operations to be performed with respect to the non-stencil integer data are such that decompression and recompression are not required (e.g., incr_wrap and decr_wrap operations). Accordingly, some embodiments of the data compression and method are directed to compressing data other than stencil data.

Figure 1:
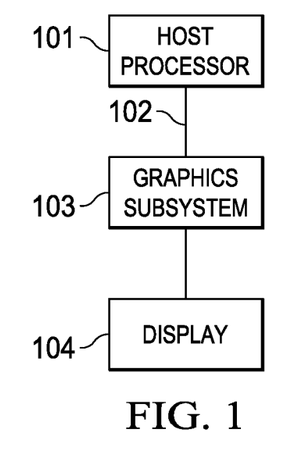
FIG. 1 is a block diagram of one embodiment of a graphics computer.

Before illustrating and describing various embodiments of the stencil data compression system and method, a representative environment within which the system and method may operate will be illustrated and described. FIG. 1 shows a block diagram of a graphics computer, in accordance with one embodiment. As shown, a host processor 101 stores and executes an application program. Such application program issues graphics commands over a connection 102 to a graphics subsystem 103. The interconnect 102 can either be a general purpose bus that is shared with other I/O devices, e.g., an PCI bus, or a dedicated graphics bus, e.g., an AGP bus. Of course, any type of interconnect 102 may be used. In use, the graphics subsystem 103 may receive graphics commands and, in response, either update its internal state or renders primitives described by the host processor 101 to a display device 104.

Figure 2:
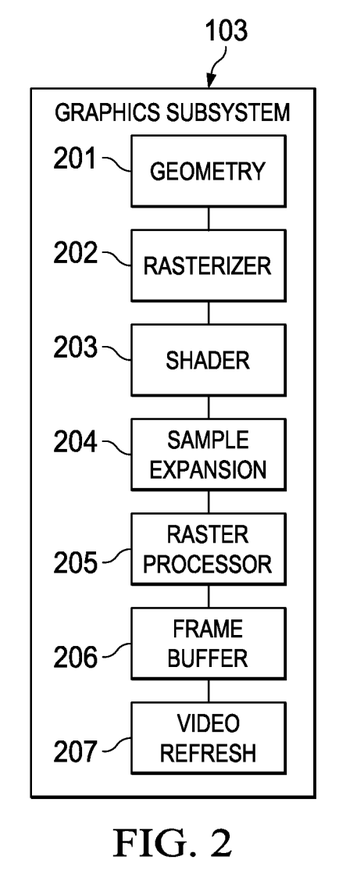
FIG. 2 is a block diagram of one embodiment of the graphics subsystem of FIG. 1.

FIG. 2 illustrates a more detailed diagram showing the internal structure of the graphics subsystem 102 of FIG. 1. As shown, a geometry stage 201 is provided which transforms primitives into a screen-aligned coordinate system. The geometry stage 201 also may remove portions of the primitives that fall outside the rendering area (clipping). Other computations may be performed by the geometry stage 201 such as lighting to determine the color of each vertex describing the primitives.

The transformed vertices form the input for a rasterizer 202. The rasterizer 202 computes a fragment for each pixel covered by each of the primitives. A coverage mask stored with the fragment indicates which portions of the pixel the fragment covers.

Also included is a shader 203 that computes the final fragment, e.g., by applying texture maps or shader programs to the fragment. A sample expansion stage 204 then generates multiple samples for each fragment.

Figure 3:
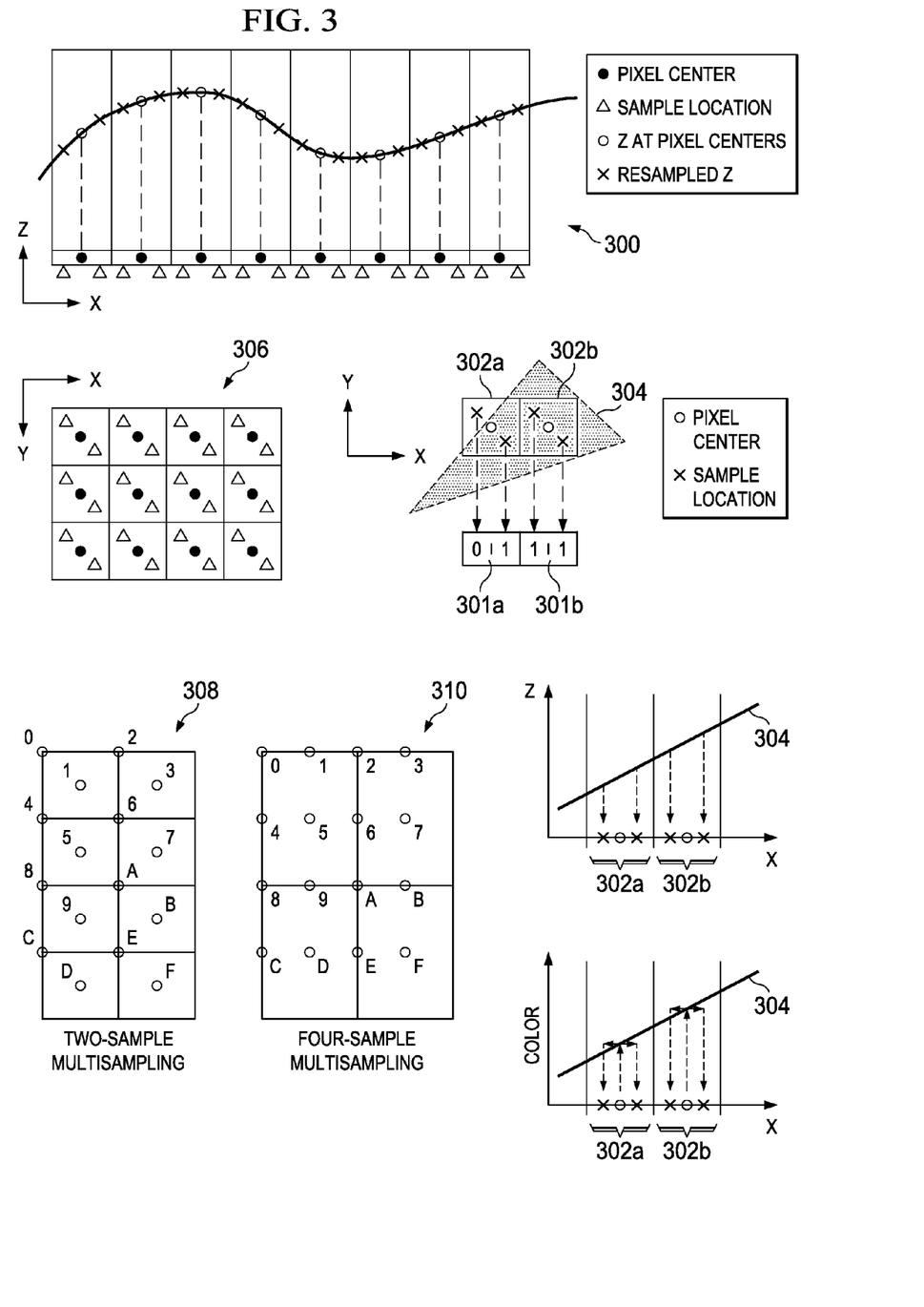
FIG. 3 shows possible sample patterns for two-sample multisampling and four-sample multisampling.

FIG. 3 illustrates the effect of multisampling. The sample expansion stage receives fragments containing sample masks (301a and 301b), computed by the rasterizer 202. The coverage bits within the sample masks indicate which samples within pixels (302a and 302b) the primitive 304 covers. The sampling expansion stage 204 generates a new sample fragment for each covered sample in the sample mask. The process of multisampling 306 adjusts the fragment depth value to approximate the actual depth value at each sample location in the pixel. All samples within a fragment carry the same color. FIG. 3 shows possible sample patterns for two-sample multisampling 308 and four-sample multisampling 310. Other sample patterns, and patterns with differing numbers of samples per pixel may be chosen, of course.

After multisampling, the individual samples are sent to a raster processor 205 as if they were regular fragments. The raster-processor 205 performs various operations on the fragments, including z/stencil testing and color or alpha blending. This may require the raster processor 205 to read a frame buffer 206 in order to retrieve the destination Z or the destination color. To this end, the final pixel color and Z are written back to the frame buffer 206.

When all primitives in the scene have been rendered in this manner, the contents of the frame buffer 206 are scanned out by a video refresh unit 207 and sent to the display 104. In the case of a multisampled color buffer, the (high-resolution) multisample image is downfiltered to display resolution. Downfiltering can be done during the process of scan out and display. Alternatively, downfiltering can be done as a separate operation prior to display.

In one embodiment, all the foregoing components of the graphics system 103 except the frame buffer 206 are situated on a single semiconductor platform. Of course, the various modules may also be situated separately or in various combinations of semiconductor platforms per the desires of the user. As used herein, the "single semiconductor platform" may refer to a sole, unitary, semiconductor-based integrated circuit or chip. It should be noted that the term, "single semiconductor platform," may also refer to multi-chip modules with increased connectivity which simulate on-chip operation, and make substantial improvements over using a conventional central processing unit (CPU) and bus implementation.

Typically, the frame buffer 206 takes the form of dynamic random access memory (DRAM). Such DRAM is organized as a matrix of storage bits. Read or write accesses to bits in the same row can be performed more efficiently than to bits in different rows. In one preferred embodiment, data within the frame buffer 206 is organized so that data for 4×4-sample "sets" are stored at contiguous addresses within the same DRAM bank and row.

In the context of the present description, such set of samples may include a rectilinear set of samples, a conventional "tile," or any other desired grouping of samples. As an option, a plurality of the sets of samples may form a single frame, such that sets of samples may be transferred as an image is assembled piece-by-piece.

Processing of fragments may be organized such that fragments for samples in a particular group are collected and processed together to exploit the faster access time to pixels in a group more fully. While various techniques may be employed for accomplishing this, one suitable technique may be found in U.S. Pat. No. 6,075,544, which issued on to Malachowski, et al., on Jun. 13, 2000, and is entitled "Method and Apparatus for Accelerating Rendering by Coalescing Data Accesses."

In the present description, it may be assumed that groups are 2×4 sample neighborhoods, i.e., sample fragments are processed in groups of eight pixels (eight samples when anti-aliasing is being employed). It should be noted, however, that group sizes larger and smaller are possible and may be preferable in certain circumstances.

For example, a size of the set of samples is dictated by a transaction size of the frame buffer. Such transaction size of the frame buffer may be a size of data that the frame buffer is capable of reading and writing in an efficient manner.

Figure 4:
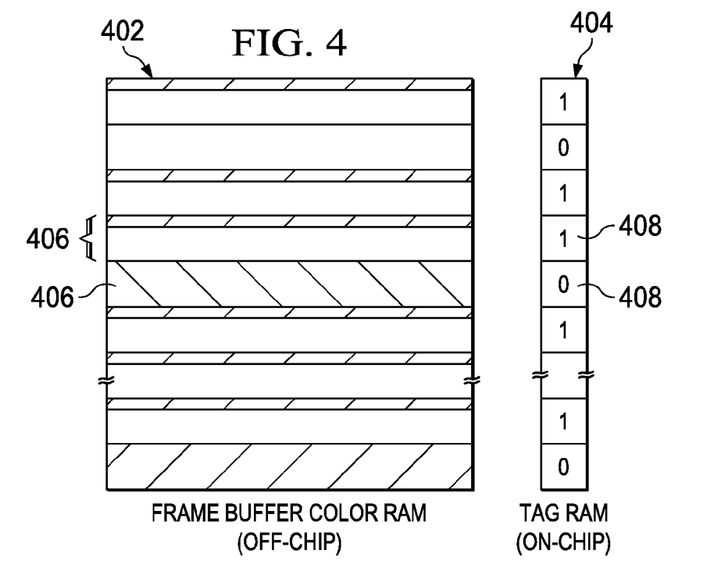
FIG. 4 illustrates the contents of the frame buffer of FIG. 2 and an associated tag memory.

FIG. 4 illustrates the contents of the frame buffer 402 and an associated tag memory 404. For every group 406 stored in the frame buffer 402, a tag bit 408 is allocated in the tag memory. Such tag memory may or may not reside on a chip associated with the graphics subsystem 103. Each bit in the tag memory stores the compression status (including the stencil data compression status) of the associated frame buffer group. This allows frame buffer clients (e.g., the raster processor 205 or the video refresh unit 207) to interpret the contents of the frame buffer 206 properly. Further shown is the manner in which some groups require a full allocated memory space while some groups require a fraction thereof, as set forth hereinabove.

It should be noted that not every group is compressible. In some applications, most or all groups will be compressible. In others, none may be compressible. Because one cannot guarantee how many groups will compress, space is allocated in the frame buffer 402 for the worst-possible case—that of all groups being incompressible.

A data structure is thus provided including color objects (i.e., 406) with color information, and compression format objects (i.e., 408) associated with the color objects. The compression format objects are thus capable of identifying a type of compression (none, type1, etc.) carried out on the color objects. In use, the compression format objects are capable of being used to decompress the color objects.

The compression format objects 408 thus act as identifier for indicating whether the samples are compressed and, if so, what type of compression is associated therewith. This may also be accomplished using format code. As an option, the identifier and/or format code may be stored in the compression samples.

By associating tag bits with selected portions of the memory address space, rather than with particular buffers accessed by one client (e.g., the raster processor), any client can access compressed or compressible data such that these clients have no knowledge that the data stored in memory may be compressed. For further information on how accesses from other clients may be performed transparently, see U.S. patent application Ser. No. 09/687,036 filed Oct. 12, 2000, and entitled "Method and Apparatus for Managing and Accessing Depth Data in a Computer Graphics System".

Figure 5:
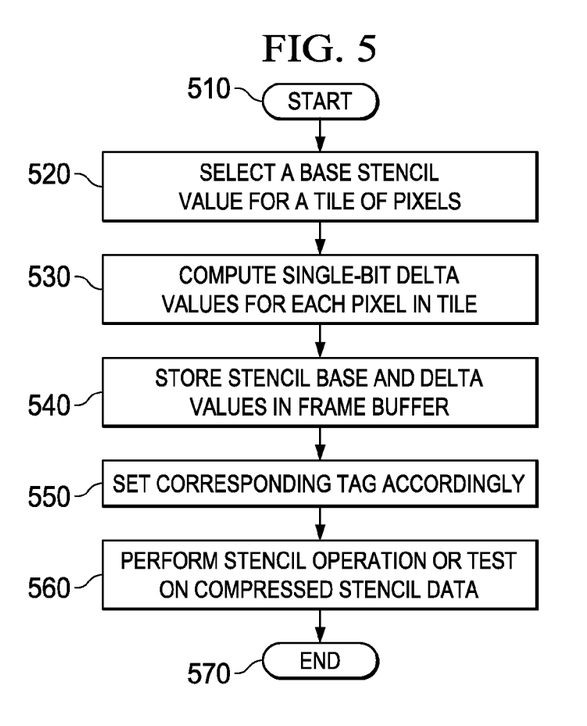
FIG. 5 is a flow diagram of one embodiment of a stencil data compression method.

Having described a representative environment within which the system and method may operate, various embodiments of the stencil data compression method will now be illustrated and described. Accordingly, FIG. 5 is a flow diagram of one embodiment of a stencil data compression method. The method begins in a step 510 with a group being defined as a certain number of pixels. In a step 520, a base stencil value is selected for a particular group. In a step 530, a single-bit delta values is selected for each pixel in the particular group. In one embodiment, the group size is eight samples and the base stencil value is an 8-bit value. Eight delta values correspond to the eight samples in the group, resulting in a total of 16 bits to represent the group. As will be apparent below, the eight delta values serve as a "mask" for at least some stencil operations. In a step 540, the stencil base and delta values are stored in a frame buffer. In an alternative embodiment, the uncompressed stencil data for the group are stored in lieu of the base stencil and delta values for a group that is incompressible due to an excessive stencil value variation among the pixels therein.

Having stored either the stencil base and delta values or, alternatively, the uncompressed stencil data, for the group in the frame buffer, a corresponding tag is set or cleared in a tag memory associated with the frame buffer in a step 550. In a step 560, one or more stencil operations or tests are performed with respect to the group using the frame buffer. If the frame buffer contains uncompressed stencil data for the group, the operations or tests are performed directly on the uncompressed stencil data. On the other hand, if the frame buffer contains (compressed) base stencil and delta values for the group, the operations or tests are performed directly on the base stencil and delta values without requiring decompression. In one embodiment, the one or more stencil operations involve updating the compressed stencil data for the group. Instead of requiring decompression of the stencil data before the updating and recompression of the stencil data after the updating, the methods described herein compress the stencil data such that updating can occur directly on the compressed stencil base and delta values. The method ends in an end step 570.

Various embodiments of the stencil data compression system employ hardware, e.g., of the type described in conjunction with FIGS. 1-4, to carry out various embodiments of the above-described method. Those skilled in the pertinent art will understand, however, that the method described herein can be carried out in any combination of hardware or microcode, firmware or software programs without departing from the broad scope of the invention. If embodied in microcode, firmware or software programs, the software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, e.g., one or more of the steps of the method of FIG. 5, or functions described herein.

Tables 1-3, below, set forth pseudocode for example wrapping increment (incr_wrap), wrapping decrement (decr_wrap) and replace algorithms that may be carried out on the compressed base stencil and delta values directly (that is, without requiring prior decompression). In each case, single-bit delta values allow the increment, decrement and replace operations, which are common stencil operations, to be implemented in a straightforward manner as bitwise operations on the 8-bit delta values, or "mask," within a group. Those skilled in the pertinent art will understand, however, that the invention is not limited to the examples of Tables 1-3. In particular, some embodiments accommodate certain other values of the writemask as well as the INVERT and ZERO operations employed therein.

The example algorithms of Tables 1-3 assume the only other stencil operation is KEEP, wmask=0xFF, and are able to run at an 8× rate in certain implementations.

TABLE 1

Pseudocode for Example Increment Algorithm

```
inmask = 8b input coverage mask;
if (inmask == ~0) {
    // fully covered
    increment the base stencil value;
} else if ((inmask | samplegroupmask) == ~0) {
    // between the current and new mask, the group is now fully
    // covered
    increment the base stencil value;
    // the new mask is the intersection of the two masks
    samplegroupmask &= inmask;
} else if ((inmask & samplegroupmask) == 0) {
    // the group is partially covered, but new samples don't
    // overlap old samples
    samplegroupmask |= inmask;
} else {
    // we have a range of 2 in the sample group, need to
    // decompress
    decompress;
}
```

TABLE 2

Pseudocode for Example Decrement Algorithm

```
inmask = 8b input coverage mask;
if (inmask == ~0) {
    // fully covered
    decrement the base stencil value;
} else if ((inmask & samplegroupmask) == inmask) {
    // covered samples are a subset of incremented samples
    samplegroupmask &= ~inmask;
} else if ((inmask & samplegroupmask) == samplegroupmask) {
    // covered samples are a superset of incremented samples
    decrement the base stencil value
    // incremented samples are XNOR of masks
    // bits are zero only if inmask=1 & samplegroupmask=0
    samplegroupmask = ~(inmask ^ samplegroupmask);
} else {
    // we have a range of 2 in the sample group, need to
    // decompress
    decompress;
}
```

TABLE 3

Pseudocode for Example Replace Algorithm

```
inmask = 8b input coverage mask;
if (inmask == ~0) {
    // fully covered
    base = ref;
    samplegroupmask = 0;
} else if (ref == base) {
    // clear inmask
    samplegroupmask &= ~inmask;
} else if (ref-1 == base) {
    // set inmask
    samplegroupmask |= inmask;
} else {
    // we have a range of >=2 in the sample group, need to
    // decompress
    decompress;
}
```

Table 4, below, sets forth pseudocode for an example stencil test algorithm. In one embodiment, the stencil test algorithm is capable of applying two tests for every eight-sample group and therefore running at a 4× rate and further can fast-path when samplegroupmask=0.

TABLE 4

Pseudocode for Example Stencil Test Algorithm

```
spass0 = test(base, ref)
spass1 = test(base+1, ref)
spass[i] = samplegroupmask[i] ? spass1 : spass0;
```

Decompressing and compressing are also quite straightforward, as pseudocode in Tables 5 and 6 demonstrate. As described above, conventional stencil compression techniques involved palette schemes for compression, requiring decompression and recompression to be carried out before and after any stencil test or operation. Recompression using a palette scheme is computationally expensive and in the worst case is hard to do because other uncompressed data may be required from the frame buffer. In contrast, the compression/decompression techniques introduced herein are made efficient, because they take advantage of the fact that delta values are single bits. Comparisons are simpler, most adders can be avoided in compression, and adders can be avoided altogether in decompression.

TABLE 5

Pseudocode for Example Decompression Algorithm

```
Compute basep1=base+1
Sample value[i] = (mask[i] ? basep1 : base)
```

TABLE 6

Pseudocode for Example Compression Algorithm

```
x=first sample's value
mask(x+1) = (sample[i] == x+1)
mask(x)   = (sample[i] == x)
mask(x-1) = (sample[i] == x-1)
if ((mask(x-1) && mask(x+1)) || (mask(x)|mask(x-1)|mask(x+1) !=
0xFF)) {
    not compressible;
} else if (mask(x+1) != 0) {
    base=x, samplegroupmask = mask(x+1);
} else if (mask(x-1) != 0) {
    base=x-1, samplegroupmask = mask(x);
```

TABLE 6-continued

Pseudocode for Example Compression Algorithm

```
   } else {
      assert(mask(x)==0xFF), base=x, samplegroupmask = 0;
   }
```

Figure 6:
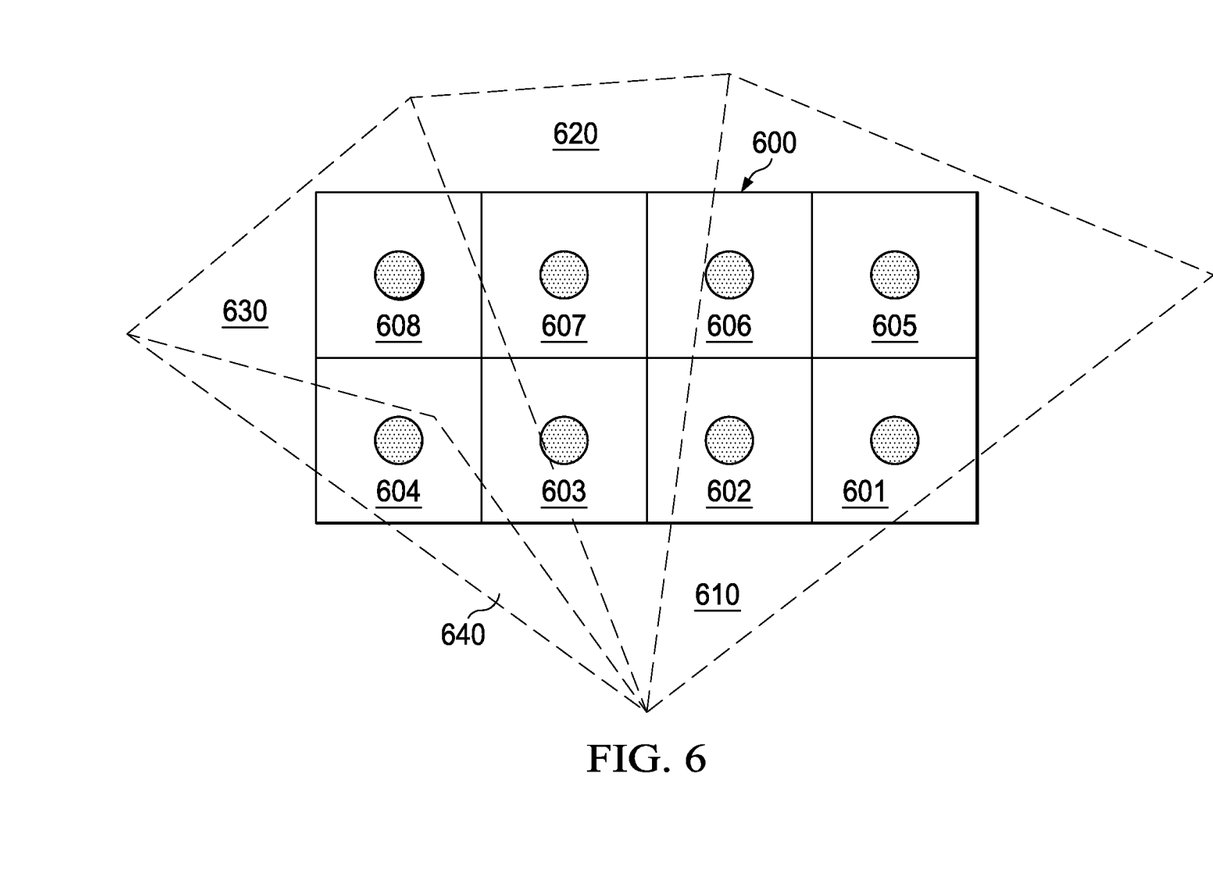
FIG. 6 is a diagram of a first example of stencil data compression involving a triangle fan.
Figure 7:
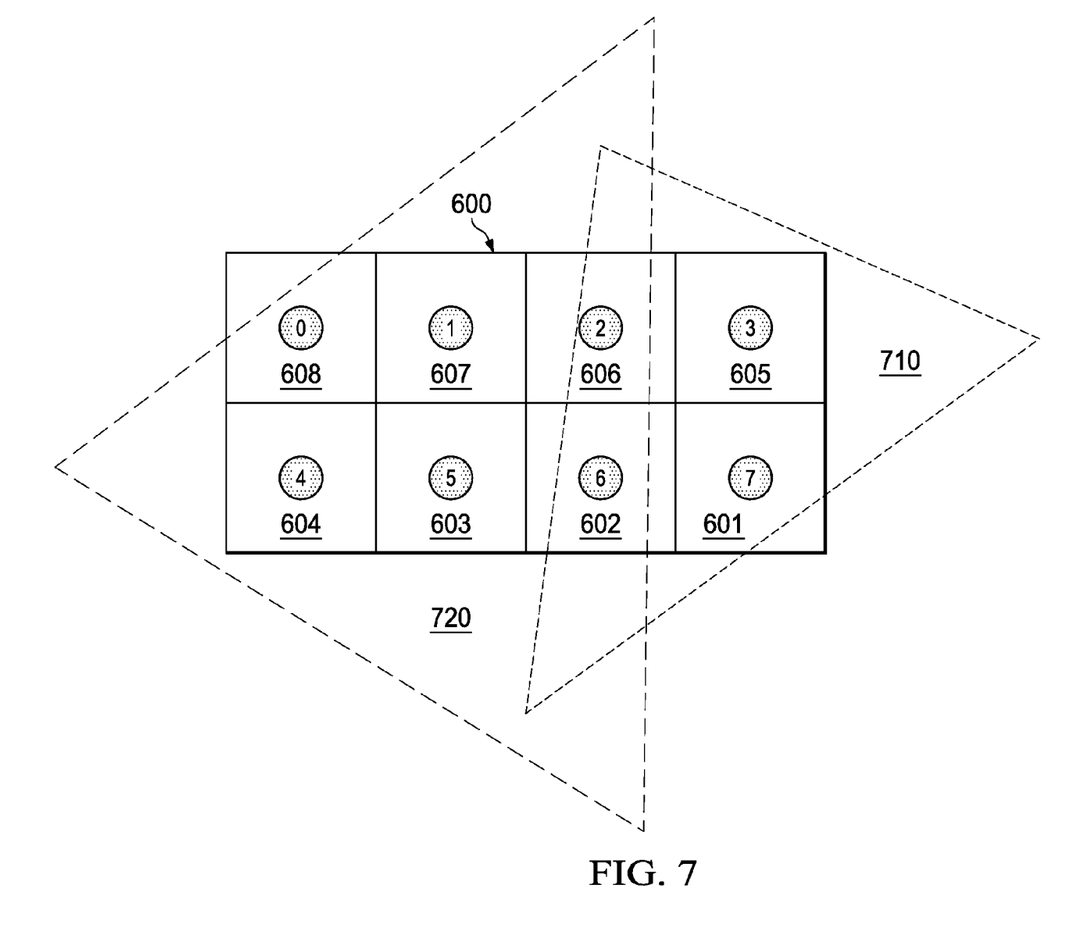
FIG. 7 is a diagram of a second example of stencil data compression involving a simple triangle overlap.
Figure 8:
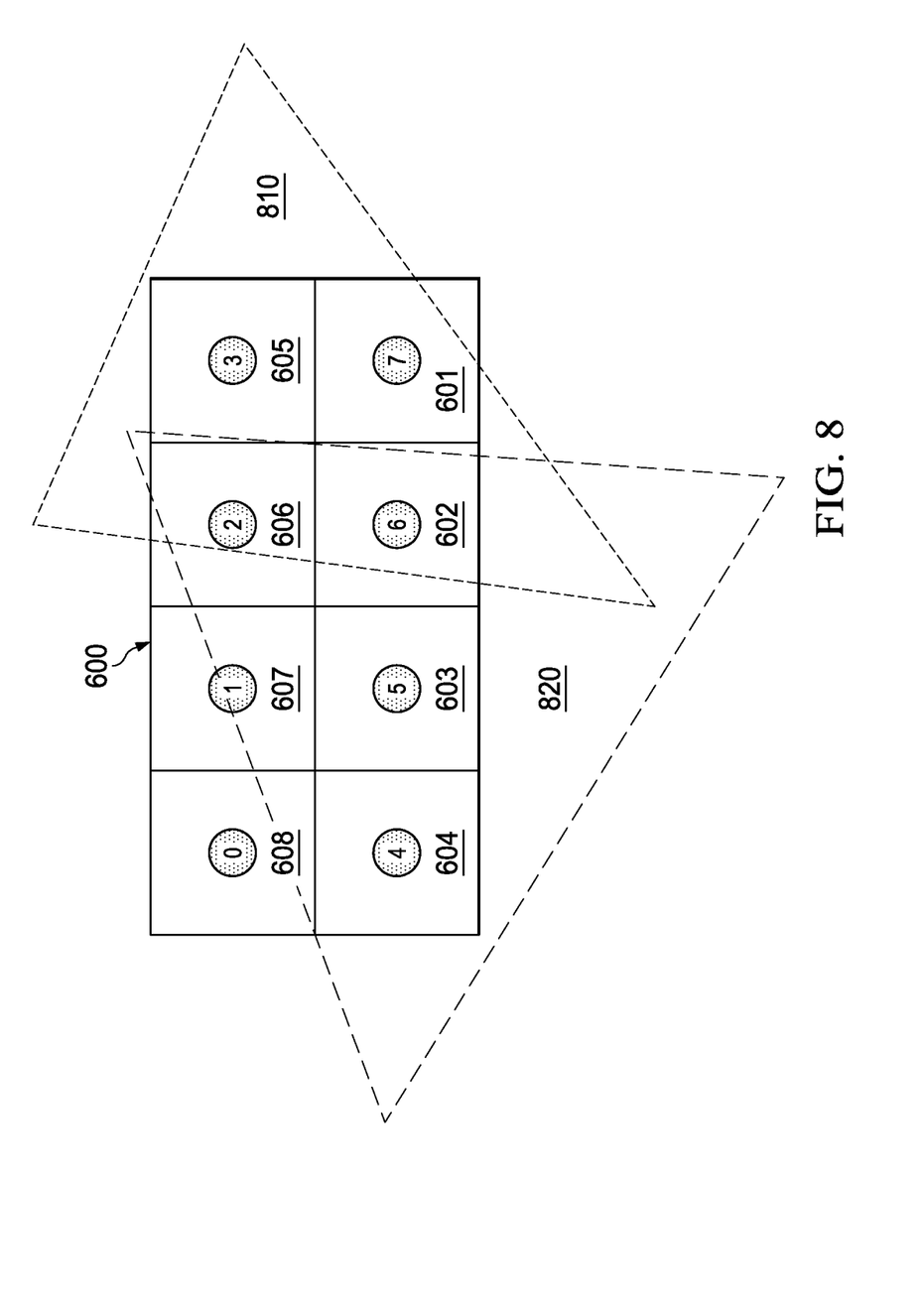
FIG. 8 is a diagram of a third example of stencil data compression involving a complex triangle overlap.

Having described various embodiments of the stencil data compression system and method, three examples of their application will now be set forth. The first example (FIG. 6) involves a triangle fan; the second example (FIG. 7) involves a simple triangle overlap; and the third example (FIG. 8) involves a complex triangle overlap. FIGS. 6-8 all involve a 2×4 group 600 of eight samples.

FIG. 6 is a diagram of a first example of stencil data compression involving a triangle fan. As the fan intersects the sample group, some pixels are covered by each triangle but the values still fit within the base stencil/delta value encoding. In accordance with Table 2, once the group is fully covered, the base stencil value is incremented, and the delta values are reset to zero.

In an initial state, the base stencil value is reset to 0, and the delta values are reset to 00000000b. A first triangle 610 covers samples 601, 602, 605, 606 in a group 600 as shown. A resulting "input coverage mask" of 11001100b is applied to the delta values of 00000000b in an incr_wrap operation to yield delta values of 11001100b. The base stencil value remains 0. A second triangle 620 covers samples 603, 607 in the group 600. A resulting input coverage mask of 00100010b is applied to the delta values of 11001100b in an incr_wrap operation to yield delta values of 11101110b. The base stencil value remains 0. A third triangle 630 covers samples 604, 608 in the group 600. A resulting input coverage mask of 00010001b is applied to the delta values of 11101110b in an incr_wrap operation to yield delta values of 11111111b, indicating that the group 600 is fully covered. Accordingly, the delta values are reset to 00000000b, and the base stencil value is incremented to 1. A fourth triangle 640, which is a backfacing triangle, covers only the sample 604. A resulting input coverage mask of 00010000b is applied to the delta values of 00000000b in a decr_wrap operation to yield delta values of 11101111b. Likewise, the base stencil value is decremented to become 0.

FIG. 7 is a diagram of a second example of stencil data compression involving a simple triangle overlap. In an initial state, the base stencil value is reset to 0, and the delta values are reset to 00000000b, as with the first example above. A first triangle 710 covers the samples 601, 602, 605, 606. A resulting input coverage mask of 11001100b is applied to the delta values of 00000000b in an incr_wrap operation to yield delta values of 11001100b. The base stencil value remains 0. A second triangle 720 covers the samples 602, 603, 604, 606, 607, 608. A resulting input coverage mask of 01110111b is applied to the delta values of 11001100b in an incr_wrap operation to yield delta values of 11111111b, indicating that the group 600 is fully covered. The base stencil value is incremented to become 1. However, a comparison between the input coverage mask and the delta values as they were yields an overlap, yielding delta values of 01000100b.

FIG. 8 is a diagram of a third example of stencil data compression involving a complex triangle overlap. In an initial state, the base stencil value is reset to 0, and the delta values are reset to 00000000b, as with the first and second examples above. A first triangle 810 covers the samples 601, 602, 605, 606. A resulting input coverage mask of 11001100b is applied to the delta values of 00000000b in an incr_wrap operation to yield delta values of 11001100b. The base stencil value remains 0. A second triangle 820 covers the samples 602, 603, 604, 606, 607. The sample 608 remains uncovered. A resulting input coverage mask of 01110110b is applied to the delta values of 11001100b in an incr_wrap operation. Unfortunately, the delta within the group exceeds that which can be represented in a single bit. This excessive stencil value variation requires that the group be decompressed for further stencil operations to be performed and disqualifies the group from future compression.

Those skilled in the art to which this application relates will appreciate that other and further additions, deletions, substitutions and modifications may be made to the described embodiments.

What is claimed is:

1. A stencil data compression method, comprising:
   receiving a first primitive;
   deriving a base stencil value for a particular group of samples partially overlapping said first primitive, said first primitive not completely overlapping said particular group of samples;
   deriving a single bit delta value for each of said samples;
   storing said base stencil value and said single bit delta values in a frame buffer;
   receiving a second primitive, wherein said second primitive partially overlaps said first primitive and includes an input coverage mask consisting of single bit values;
   applying said input coverage mask of said second primitive to said base stencil value and said single bit delta samples of said first primitive using at least one stencil operation to update said stored base stencil value and said single bit delta values stored in said frame buffer.

2. The method as recited in claim 1 wherein a size of said particular group is eight samples and said base stencil value is an 8-bit value.

3. The method as recited in claim 1 further comprising storing uncompressed stencil data for said particular group in said frame buffer in lieu of said base stencil value and said delta values when said particular group is incompressible.

4. The method as recited in claim 1 further comprising setting a corresponding tag in a tag memory associated with said frame buffer.

5. The method as recited in claim 1 wherein said at least one stencil operation is selected from the group consisting of:
   a wrapping increment operation,
   a wrapping decrement operation, and
   a replace operation.

6. The method as recited in claim 1 wherein said delta values function as a mask for bitwise operations.

7. A data compression system, comprising:
   a frame buffer; and
   a raster processor configured to:
      receive a first primitive;
      derive a base stencil value for a particular group of samples partially overlapping said first primitive, said first primitive not completely overlapping said particular group of samples;
      derive a single bit delta value for each of said samples;
      store said base stencil value and said single bit delta values in said frame buffer;
      receive a second primitive, wherein said second primitive partially overlaps said first primitive and includes an input coverage mask consisting of single bit values;

apply said input coverage mask of said second primitive to said base stencil value and said single bit delta samples of said first primitive using at least one stencil operation to update said stored base stencil value and said single bit delta values stored in said frame buffer.

8. The system as recited in claim 7 wherein a size of said particular group is eight samples.

9. The system as recited in claim 7 wherein said frame buffer is further configured to store uncompressed stencil data for said particular group in said frame buffer in lieu of said base stencil value and said delta values when said particular group is incompressible.

10. The system as recited in claim 7 wherein said rasterizer is further configured to set a corresponding tag in a tag memory associated with said frame buffer.

11. The system as recited in claim 7 wherein said at least one stencil operation is selected from the group consisting of:
   a wrapping increment operation,
   a wrapping decrement operation, and
   a replace operation.

12. The system as recited in claim 7 wherein said delta values function as a mask for bitwise operations.

13. A graphics processing unit, comprising:
   a geometry stage configured to transform primitives into a screen-aligned coordinate system;
   a frame buffer; and
   a raster processor configured to:
      receive a first of said primitives;
      derive a base stencil value for a particular group of samples partially overlapping said first primitive, said first primitive not completely overlapping said particular group of samples;
      derive a single bit delta value for each of said samples;
      store said base stencil value and said single bit delta values in said frame buffer;
      receive second of said primitives, wherein said second primitive partially overlaps said first primitive and includes an input coverage mask consisting of single bit values;
      apply said input coverage mask of said second primitive to said base stencil value and said single bit delta samples of said first primitive using at least one stencil operation to update said stored base stencil value and said single bit delta values stored in said frame buffer.

14. The graphics processing unit as recited in claim 13 wherein a size of said particular group is eight samples and said base stencil value is an 8-bit value.

15. The graphics processing unit as recited in claim 13 wherein said raster processor is further configured to set a corresponding tag in a tag memory associated with said frame buffer.

16. The graphics processing unit as recited in claim 13 wherein said at least one stencil operation is selected from the group consisting of:
   a wrapping increment operation,
   a wrapping decrement operation, and
   a replace operation.

17. The graphics processing unit as recited in claim 13 wherein said delta values function as a mask for bitwise operations.

* * * * *